(12) United States Patent
Zhu et al.

(10) Patent No.: US 6,636,655 B2
(45) Date of Patent: Oct. 21, 2003

(54) MEMS OPTICAL SWITCHES HAVING OBLIQUELY ANGLED INPUTS AND OUTPUTS RELATIVE TO A FACE THEREOF AND MOVEABLE REFLECTORS WITH PARALLEL POSITIONS THEREIN AND METHODS OF FORMING SAME

(75) Inventors: Terry D. Zhu, Cary, NC (US); Mark Walters, Durham, NC (US)

(73) Assignee: Memscap S.A.

( * ) Notice: Subject to any disclaimer, the term of this patent is extended or adjusted under 35 U.S.C. 154(b) by 76 days.

(21) Appl. No.: 09/939,060

(22) Filed: Aug. 24, 2001

(65) Prior Publication Data

US 2002/0048426 A1 Apr. 25, 2002

Related U.S. Application Data

(60) Provisional application No. 60/228,648, filed on Aug. 29, 2000.

(51) Int. Cl.⁷ .............................. G02B 6/26; G02B 6/42
(52) U.S. Cl. ............................ 385/18; 385/17; 385/19; 385/22
(58) Field of Search ........................... 385/18, 17, 19, 385/22

(56) References Cited

U.S. PATENT DOCUMENTS

| | | | |
|---|---|---|---|
| 4,580,873 A | 4/1986 | Levinson | 350/96.2 |
| 5,778,118 A | 7/1998 | Sridhar | 385/24 |
| 5,841,917 A | 11/1998 | Jungerman et al. | 385/17 |
| 5,909,078 A | 6/1999 | Wood et al. | 310/307 |
| 5,955,817 A | 9/1999 | Dhuler et al. | 310/307 |
| 5,960,132 A | 9/1999 | Lin | 385/18 |
| 5,960,133 A | 9/1999 | Tomlinson | 385/18 |
| 5,962,949 A | 10/1999 | Dhuler et al. | 310/307 |
| 5,974,207 A | 10/1999 | Aksyuk et al. | 385/24 |
| 5,994,816 A | 11/1999 | Dhuler et al. | 310/307 |
| 5,995,817 A | 11/1999 | Lubbe et al. | 455/266 |
| 6,023,121 A | 2/2000 | Dhuler et al. | 310/307 |
| 6,144,781 A | 11/2000 | Goldstein et al. | 385/18 |
| 6,215,222 B1 | 4/2001 | Hoen | 310/309 |
| 6,243,507 B1 * | 6/2001 | Goldstein et al. | 385/13 |
| 6,259,835 B1 | 7/2001 | Jing | 385/18 |
| 6,379,510 B1 * | 4/2002 | Kane et al. | 204/192.34 |
| 6,396,975 B1 * | 5/2002 | Wood et al. | 385/18 |
| 6,411,754 B1 * | 6/2002 | Akkaraju et al. | 385/22 |
| 6,445,842 B1 * | 9/2002 | Dhuler et al. | 385/17 |
| 6,477,290 B1 * | 11/2002 | Wan et al. | 385/17 |

* cited by examiner

Primary Examiner—Brian Healy
Assistant Examiner—Tina M Lin
(74) Attorney, Agent, or Firm—Myers Bigel Sibley & Sajovec

(57) ABSTRACT

MEMS optical switches can include a substrate having first and second opposing faces and at least one side therebetween. An input is obliquely angled towards the face and optically couples optical radiation towards the face. A movable reflector is on the face and moves from a first position to a second position that is parallel to the first position to reflect the optical radiation from the input to provide reflected optical radiation. A output is obliquely angled away from the face and optically couples the reflected optical radiation away from the face.

31 Claims, 9 Drawing Sheets

| First moveable reflector postion | Second moveable reflector postion | I1 | I2 | I3 |
|---|---|---|---|---|
| 0 | 0 | O1 | O2 | O3 |
| 0 | 1 | O1 | O3 | O3 |
| 1 | 0 | O2 | O1 | O3 |
| 1 | 1 | O3 | O1 | O2 |

MEMS OPTICAL SWITCHES HAVING OBLIQUELY ANGLED INPUTS AND OUTPUTS RELATIVE TO A FACE THEREOF AND MOVEABLE REFLECTORS WITH PARALLEL POSITIONS THEREIN AND METHODS OF FORMING SAME

CLAIM FOR PRIORITY

The present application claims priority to U.S. Provisional Patent Application No. 60/228,648, filed Aug. 29, 2000, for Zhu et al., entitled "Single Side MEMS Optical Switches and Switch Arrays with In-Plane Reflectors," the disclosure of which is incorporated herein by reference in its entirety.

FIELD OF THE INVENTION

This invention relates to electromechanical systems, and more particularly to microelectromechanical systems and methods.

BACKGROUND OF THE INVENTION

Microelectromechanical (MEMS) technology has been used in a wide range of applications. For example, MEMS devices can be used to switch optical energy from the switch inputs to selected switch outputs. MEMS optical switches, sometimes referred to as Optical Cross-Connect (OXC) switches can include an N×N array of reflectors to reflect optical energy from any switch input to any switch output. For example, in a 2×2 OXC, a selected reflector of the 2×2 array can be used to reflect the optical energy from any switch input to any switch output.

Some conventional MEMS OXC switches operate by orienting the reflectors horizontally (in the plane of the substrate on which the reflector is located) in a non-reflecting position and vertically (orthogonal to the substrate) in a reflecting position. Therefore, to switch optical energy from an input of the OXC switch to an output thereof, the selected reflector can be oriented vertically and the other reflectors are oriented horizontally.

Unfortunately, reflectors in some MEMS OXC switches may occupy a relatively large portion of the substrate, thereby reducing the number of reflectors that may be included in the MEMS OXC switch. For example, some MEMS OXC switches orient the reflectors in a horizontal position when the reflectors are in a non-reflective position as described above. Accordingly, the substrate may be over-sized to provide adequate space for all of the reflectors to be oriented horizontally on the substrate. Furthermore, magnetically actuated MEMS OXC switches may have localized magnetic actuators located under each reflector. The localized magnetic actuators may, therefore, further increase the area of the substrate which may need to be allocated to each reflector.

Other conventional MEMS optical switches can be configured to use in-plane reflectors where the inputs and outputs to the optical switch are positioned on opposite sides of the device. This configuration may require the fibers for the inputs to be aligned with the fibers for the outputs on the opposite side. In other conventional MEMS optical switches, the reflectors can be configured perpendicular to a plane of the device where the fibers for the inputs and outputs are placed in predefined channels on the device die. In this configuration, however, the reflectors may be difficult to fabricate. Thus, there continues to be a need to further improve MEMS optical switches.

SUMMARY OF THE INVENTION

Pursuant to embodiments according to the present invention, the inputs and outputs of a MEMS optical switch are obliquely angled towards and away from a face thereof and adjacent thereto. A moveable reflector is configured to be moved from a first position to a second position, that is parallel to the first position, to switch optical radiation from the inputs to the outputs. Having the inputs and outputs obliquely angled towards and away from the same face and adjacent thereto may reduce the size and/or the complexity of packaging the optical switch. Accordingly, the cost of the optical switch may be reduced.

In some embodiments according to the present invention, a MEMS optical switch includes a substrate having first and second opposing faces and at least one side therebetween. An input is obliquely angled towards the first face adjacent thereto. The input optically couples optical radiation towards the first face. A movable reflector on the first face moves from a first position to a second position that is parallel to the first position to reflect the optical radiation from the input to provide reflected optical radiation. An output is obliquely angled away from the first face adjacent thereto. The output optically couples the reflected optical radiation away from the first face.

In some embodiments according to the present invention, the moveable reflector moves between the first and second positions in a direction that is parallel to the first face. In some embodiments according to the present invention, the MEMS optical switch includes a member that extends in a direction on the first face and that is coupled to the moveable reflector. An actuator on the first face is coupled to the member. The actuator moves the moveable reflector between the first and second positions in the direction parallel to the first face.

In some embodiments according to the present invention, a thickness of a reflective portion of the moveable reflector that reflects the optical radiation is less than a thickness of the member. In some embodiments according to the present invention, the reflective portion comprises a metal and the member comprises silicon.

In some embodiments according to the present invention, the MEMS optical switch further includes a member on the first face that is coupled to the moveable reflector and an actuator on the first face that is coupled to the member. The actuator rotates the member in a direction that is parallel to the first face to move the moveable reflector between the first and second positions.

In some embodiments according to the present invention, the MEMS optical switch further includes a reflector on the first face and the moveable reflector is cantilevered over the reflector in the second position. In some embodiments according to the present invention, the MEMS optical switch further includes a recess in the first face and the reflector is in the recess.

In some embodiments according to the present invention, the reflected optical radiation is first reflected optical radiation and the output is a first output. The MEMS optical switch further includes a reflector on the first face beneath the moveable reflector. The reflector reflects the optical radiation from the input when the moveable reflector is in the first position to provide second reflected optical radiation. The MEMS optical switch further includes a second output that is obliquely angled away from the first face adjacent thereto. The second output optically couples the second reflected optical radiation away from the first face. In some embodiments according to the present invention, the MEMS optical switch further includes a nonreflecting recess in the first face aligned with the moveable reflector in the second position.

In method embodiments according to the present invention, the MEMS optical switch is formed by forming a member on a first face of a substrate. A recess is formed in the first face of the substrate adjacent to the member by etching around the member. A reflector is formed in the recess. A first reflective surface is formed on a first side of the member that faces away from the reflector. The substrate and the reflector are etched through from a second face of the substrate that is opposite the first face to expose a second side of the member opposite the first side. A second reflective surface is formed on the second side of the member that faces towards the reflector.

In some embodiments according to the present invention, the etching around the member includes wet etching around the moveable member. In some embodiments according to the present invention, the member is at least one of polysilicon, silicon rich nitride, and crystallized silicon.

In some embodiments according to the present invention, the forming a first reflective surface on the member includes etching a portion of the member using deep reactive ion etching. In some embodiments according to the present invention, the substrate is etched through to form a hole aligned to an initial position of the member. In some embodiments according to the present invention, the hole is elongated in a direction in which the member is configured to move.

DETAILED DESCRIPTION OF EMBODIMENTS OF THE INVENTION

Figure 1A:
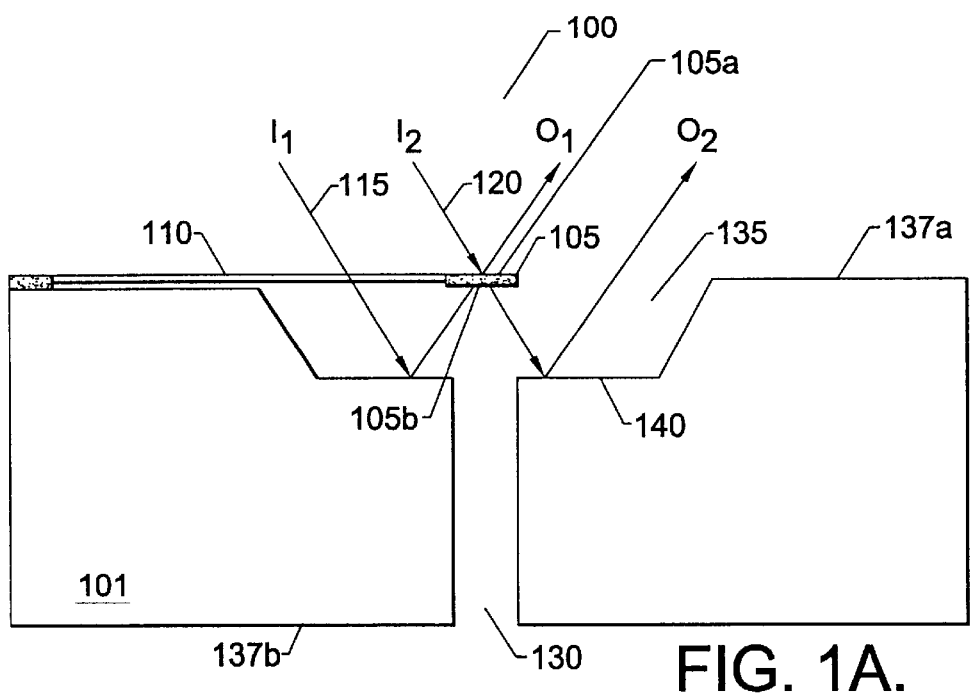
FIG. 1A is a cross-sectional view that illustrates embodiments of MEMS optical switches having inputs/outputs obliquely angled towards/away from a face of a substrate adjacent thereto and having moveable reflectors with parallel positions according to the present invention.

The present invention now will be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the thickness of layers and regions are exaggerated for clarity. Like numbers refer to like elements throughout.

It will be understood that when an element such as a layer, region or substrate is referred to as being "on" another element, it can be directly on the other element or intervening elements may also be present. In contrast, when an element is referred to as being "directly on" another element, there are no intervening elements present.

Pursuant to embodiments according to the present invention, the inputs and outputs of a MEMS optical switch can be obliquely angled towards and away from a face thereof adjacent thereto. A moveable reflector can be moved from a first position to a second position, that is parallel to the first position, to switch optical radiation from the inputs to the outputs. Having the inputs and outputs obliquely angled towards and away from the same face adjacent thereto may reduce the complexity of packaging the optical switch. Accordingly, the cost of the optical switch may be reduced.

FIG. 1A is a cross-sectional view that illustrates embodiments of a 2×2 MEMS optical switch 100 including a substrate 101 having first and second opposing faces 137*a,b* according to the present invention. The 2×2 MEMS optical switch 100 includes two inputs I1, I2 that are obliquely angled towards the first face 137*a* adjacent to the first face 137*a* and two outputs O1 and O2 that are obliquely angled away from the first face 137*a* adjacent to the first face 137*a*. The MEMS optical switch 100 includes first and second optical beam paths 115, 120. The first optical beam path 115 is defined from the first input I1 to the first output O1 and the second optical beam path 120 is defined from the second input I2 to the second output O2.

A moveable reflector 105 is on the first face 137a and includes first and second reflective surfaces 105a,b which are located on opposite sides of the moveable reflector 105. The first reflective surface 105a can be on the moveable reflector 105 facing away from the first face 137a. The second reflective surface 105b can be on the moveable reflector 105 facing towards the first face 137a.

The moveable reflector 105 is coupled to a member 110 which can be coupled to an actuator which is not shown. In some embodiments according to the present invention, the actuator is a thermal actuator, such a thermal arched beam actuator. In other embodiments according to the present invention, the actuator is a mechanical actuator, an electrostatic actuator, a magnetic actuator or the like. Other types of actuators can be used.

The moveable reflector 105 is cantilevered by the member 110 over the substrate 101. A reflector 140, which can be a fixed reflector, is located in a recess 135 beneath the moveable reflector 105. The recess 135 can also have a hole 130 formed therein. The hole 130 can be used to form the second reflective surface 105b on the moveable reflector 105 that faces the reflector 140, as will be described in detail below.

In operation, the MEMS optical switch 100 can switch optical radiation from the first and second inputs I1, I2 to the first and second outputs O1, O2. To perform the switching, the moveable reflector 105 is moved from a first position, which is outside the first and second optical beam paths 115, 120, to a second position, that is parallel to the first position, at an intersection of the first and the second optical beam paths 115, 120 as shown in FIG. 1A. For example, when the moveable reflector 105 is in the first position outside both the first and second optical beam paths 115, 120, optical radiation can be switched from the first input I1 to the first output O1 along the first optical beam path 115 by reflecting the optical radiation from the first input I1 off the reflector 140 in the recess 135. When the moveable reflector 105 is in the first position, optical radiation can also be switched from the second input I2 to the second output O2 along the second optical beam path 120 by reflecting the optical radiation from the second input I2 off the reflector 140 to the second output O2. When the moveable reflector 105 is moved to the second position at the intersection of the first and second optical beam paths 115, 120 as shown in FIG. 1A, optical radiation can be switched from the first input I1 to the second output O2 by reflecting the optical radiation from the first input I1 off reflector 140 to the second reflective surface 105b of the moveable reflector 105 back to the reflector 140 which reflects the optical radiation to the second output O2. Optical radiation can also be switched from the second input I2 to the first output O1 by reflecting optical radiation from the second input I2 off the first reflective surface 105a of the moveable reflector 105 to the first output O1.

Figure 1B:
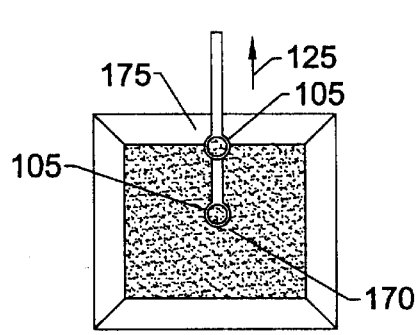
FIGS. 1B and 1C are plan views that illustrate the first and second positions associated with embodiments of moveable reflectors according to the present invention.
Figure 1C:
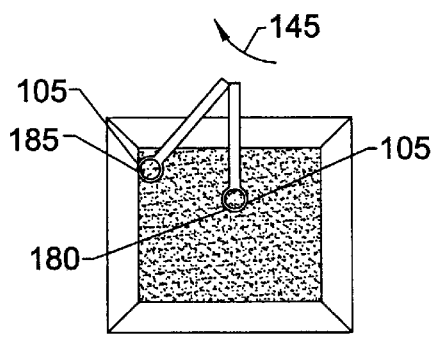

FIGS. 1B and 1C are plan views that illustrate embodiments of 2×2 MEMS optical switches according to the present invention as shown in FIG. 1A. In some embodiments according to the present invention, the moveable reflector 105 can be moved between a first position 170 and a second position 175, that is parallel to the first position 170, by actuating the member 110 in a direction 125 along an axis of the member 110 as shown in FIG. 1B. In other embodiments according to the present invention, the moveable reflector 105 is moved between a first position 180 and a second position 185, that is parallel to the first position 180 by rotating the member 110 in a direction 145 that is parallel to the first face 137a as shown in FIG. 1C. In other embodiments according to the present invention, other directions are used to move the moveable reflector 105 between the first and second parallel positions.

Figure 1D:
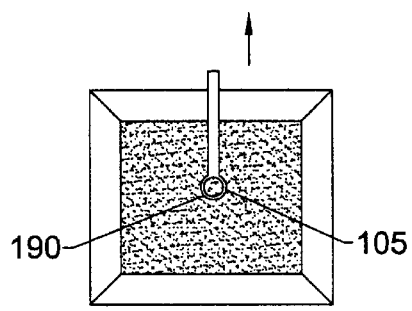
FIGS. 1D and 1E are plan views that illustrate initial positions of embodiments of moveable reflectors according to the present invention.
Figure 1E:
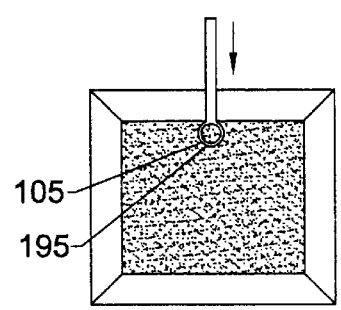

FIGS. 1D and 1E are plan views that illustrate initial positions of the moveable reflectors when formed according to embodiments of the present invention. As shown in FIG. 1D, in some embodiments according to the present invention, the moveable reflector 105 is in an initial position 190 inside the optical beam path when formed. Accordingly, the moveable reflector 105 can be moved to a position outside the optical beam path when an associated actuator coupled to the moveable reflector 105 moves, such as when the actuator is heated. In other embodiments according to the present invention, as shown in FIG. 1E, the moveable reflector 105 is formed in a position 195 that is outside the optical beam path. Accordingly, the moveable reflector 105 can be moved to a position inside the optical beam path when an associated actuator moves the reflector 105, such as when the actuator is heated.

Figure 2A:
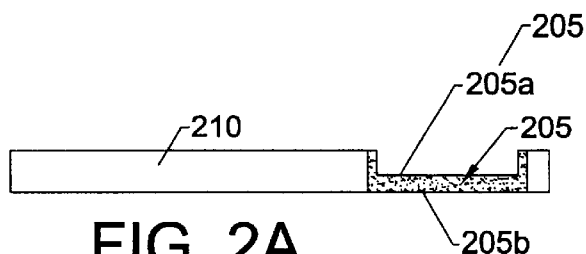
FIG. 2A is a cross-sectional view that illustrates embodiments of moveable reflectors according to the present invention.
Figure 2B:
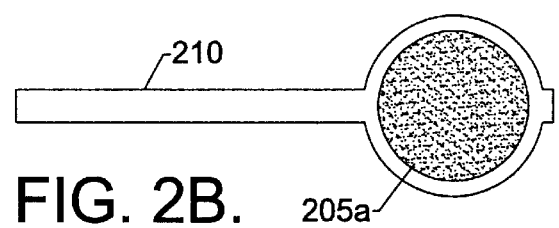
FIG. 2B is a plan view that illustrates embodiments of moveable reflectors according to the present invention as shown in FIG. 2A.

FIGS. 2A and 2B are a cross sectional view and a plan view, respectively, that illustrate embodiments of a moveable reflector 205 and a member 210 coupled thereto according to the present invention. The moveable reflector 205 can be formed by thinning the member 210 to a thickness of about 1 $\mu$m to about 2 $\mu$m using, for example, reactive ion etching. In some embodiments according to the present invention, the member 210 comprises polysilicon, silicon rich nitride, or crystallized silicon. In other embodiments according to the present invention, other materials are used.

Metal layers can be formed on the opposing sides of the thinned portion of the member 210 to provide the opposing reflective surfaces 205a,b of the moveable reflector 205. It may be desirable to provide a thin moveable reflector as shown in FIGS. 2A and 2B to reduce an offset in the positions of optical radiation which is either reflected by the first reflective surface 205a, or that is reflected along the same path by the reflector 140 in the recess 135 as shown in FIG. 1A.

Figure 3:
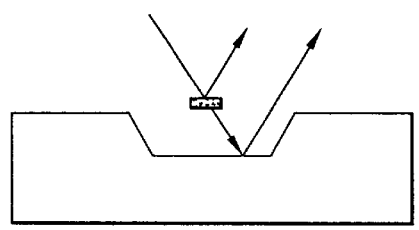
FIG. 3 is a cross-sectional view that illustrates embodiments of 1×2 MEMS optical switches according to the present invention.

It will be understood that, although FIG. 1A shows a single moveable reflector in a 2×2 MEMS optical switch, in some embodiments according to the present invention, the same configuration is used to provide a 1×2 MEMS optical switch as shown, for example, in FIG. 3.

Figure 4:
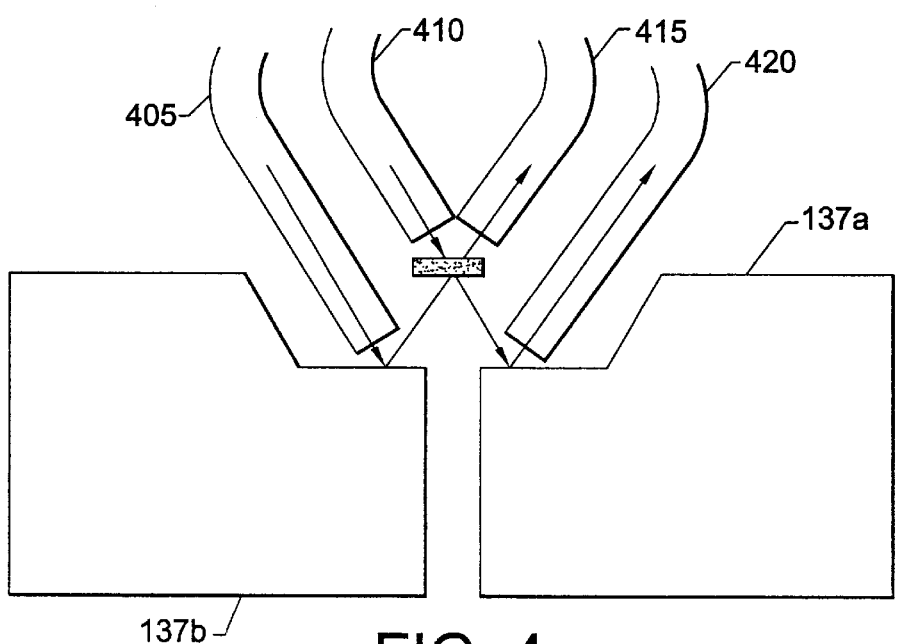
FIG. 4 is a schematic cross-sectional view that illustrates embodiments of MEMS optical switches according to the present invention.

FIG. 4 is a cross-sectional view that illustrates embodiments of a 2×2 MEMS optical switch according to the present invention having optical fibers 400, 405, 410, 415 aligned to first and second optical beam paths. As shown in FIG. 4, the fibers 400, 405, 410, 415 are obliquely angled towards and away from the face adjacent thereto. Furthermore, as shown in FIG. 4, the fibers 400, 405, 410, 415 bend towards being normal to the first face 137a as the distance from the first face 137a increases. It will be understood that in some embodiments according to the present invention, the fibers 400, 405, 410, 415 are inserted into channels that make the fibers 400, 405, 410, 415 conform to the profile shown in FIG. 4 so that the inputs and outputs are obliquely angled towards and away from the first face 137a adjacent to the first face 137a.

It will be understood, that the inputs and outputs of MEMS optical switches according to the present invention can be provided by other arrangements. For example, in some embodiments according to the present invention, the inputs and outputs are provided by the propagation of optical radiation through free-space. In other embodiments according to the present invention, the inputs and outputs are provided by propagation of optical radiation through waveguides. In still other embodiments according to the present invention, other arrangements are used to provide the inputs and outputs.

Figure 5:
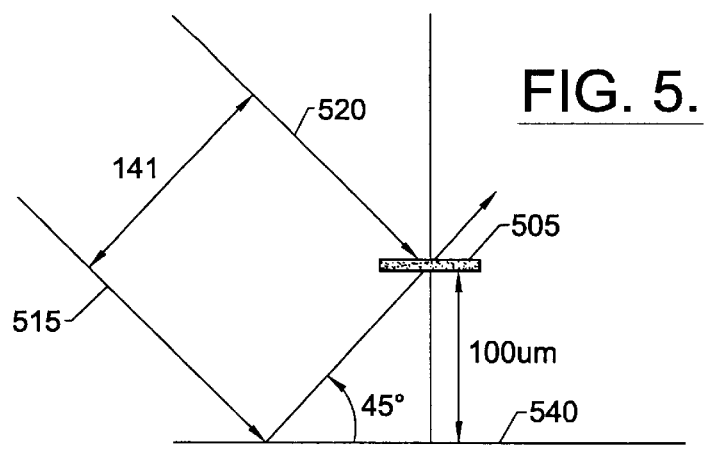
FIG. 5 is a schematic cross-sectional view that illustrates embodiments of moveable reflectors separated from fixed reflectors according to the present invention.

FIG. 5 is a cross-sectional schematic view that illustrates embodiments of moveable reflectors 505 separated from fixed reflectors 540 according to embodiments of the present invention. As shown in FIG. 5, the moveable reflector 505 is separated from the fixed reflector 540 by a distance of about 100 μm. First and second optical beam paths 515, 520 are separated by about 141 μm to define an angle of incidence of about 45 degrees with the fixed reflector 540 and with the moveable reflector 505 respectively. The moveable reflector 505 has a diameter of about 100 μm. In other embodiments according to the present invention, other angles and dimensions are used.

Figure 6:
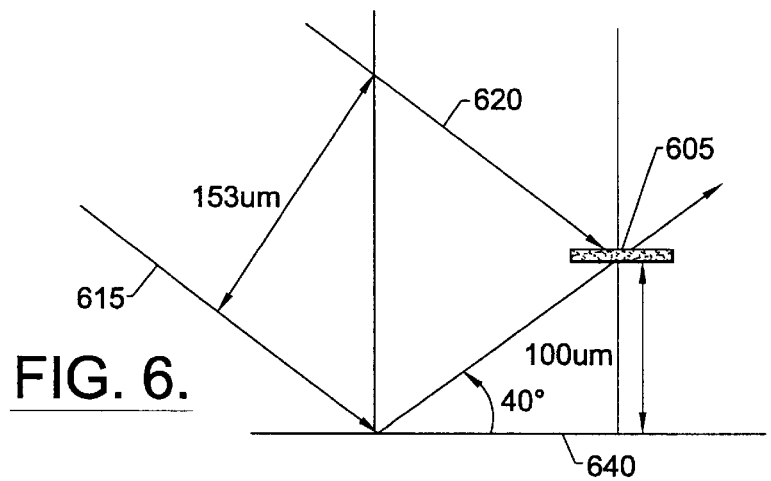
FIG. 6 is a schematic cross-sectional view that illustrates embodiments of moveable reflectors separated from fixed reflectors according to the present invention.

FIG. 6 is a cross-sectional schematic view that illustrates embodiments of a moveable reflector 605 separated from a fixed reflector 640 according to the present invention. As shown in FIG. 6, the moveable reflector 605 is separated from the fixed reflector 640 by a distance of about 100 μm. First and second optical beam paths 615, 620 are separated by a distance of about 153 microns and define angles of incidence with the fixed reflector 640 and the moveable reflector 605 of about 40 degrees. The moveable reflector 605 has a diameter of about 100 μm. In other embodiments according to the present invention, other angles and dimensions are used.

Figure 7A:
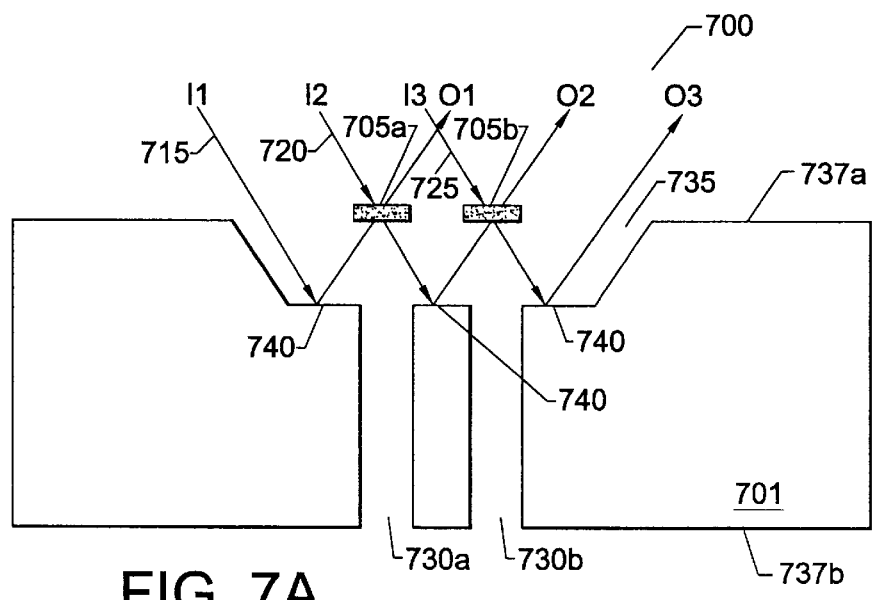
FIG. 7A is a cross-sectional view taken along line 7A–7A' in FIG. 7B that illustrates embodiments of 3×3 blocking MEMS optical switches having inputs/outputs obliquely angled towards/away from a face of the switch adjacent thereto and moveable reflectors with parallel positions according to the present invention.
Figures 7B, 7C:
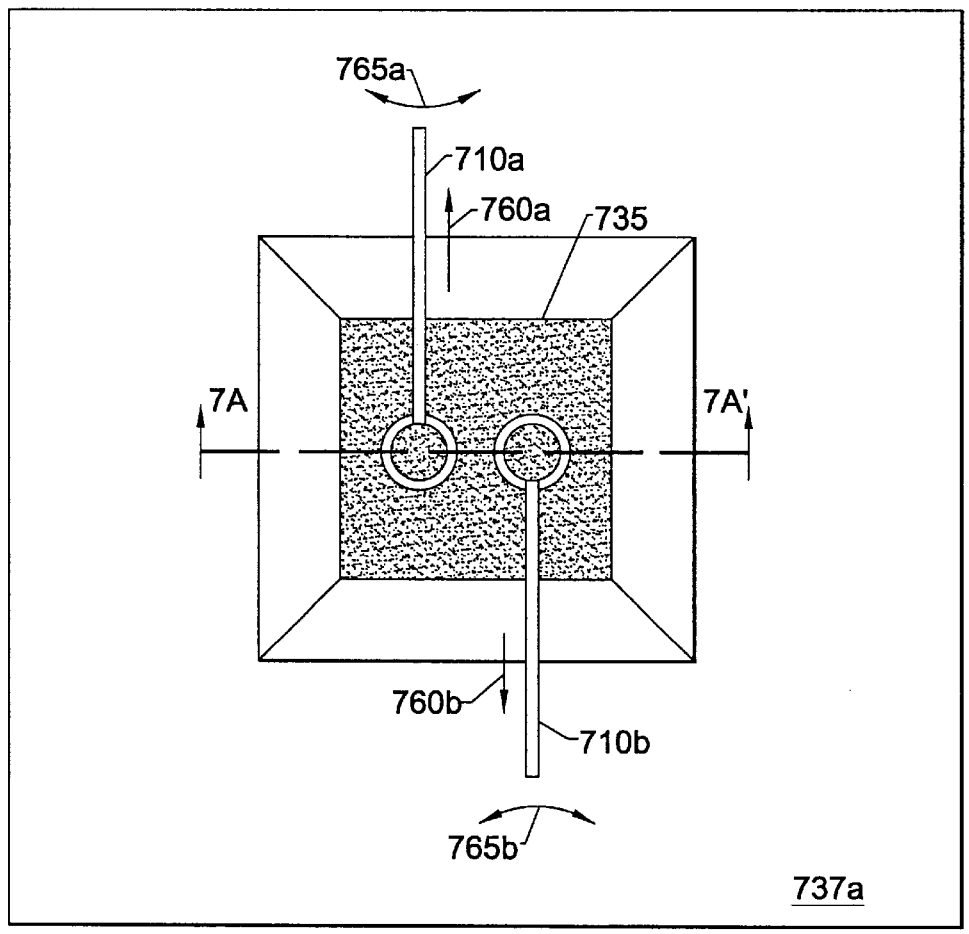
FIG. 7B is a plan view that illustrates embodiments of 3×3 blocking MEMS optical switches according to the present invention as shown in FIG. 7A.
FIG. 7C is a table that illustrates the switching functions provided the 3×3 blocking MEMS optical switch shown in FIG. 7A.

FIG. 7A is a cross-sectional view taken along line 7A–7A' in FIG. 7B that illustrates embodiments of a 3×3 blocking MEMS optical switch 700 on a substrate 701 having first and second opposing faces 737a,b according to the present invention. As shown in FIG. 7A, the 3×3 blocking MEMS optical switch 700 includes first, second, and third inputs I1, I2, and I3 respectively and first, second, and third outputs O1, O2, and O3 respectively all of which are obliquely angled towards/away from the face 737a adjacent thereto.

A first moveable reflector 705a can be moved between associated first and second positions wherein the second position is parallel to the first position. Similarly, a second moveable reflector 705b can be moved between first and second associated positions where the second position of the second moveable reflector 705b is parallel to the first position of the second moveable reflector 705b. The first and second moveable reflectors 705a,b are separated from a reflector 740 in a recess 735 in the first face 737a. A first optical beam path 715 is defined from the first input I1 to the first output O1. A second optical beam path 720 is defined from the second input I2 to the second output O2. A third optical beam path 725 is defined from the third input I3 to the third output O3.

In operation, optical radiation can be switched from the three inputs I1–I3 to the three outputs O1–O3. For example, optical radiation can be switched from the first input I1 to the second output O2 by positioning the first moveable reflector 705a at an intersection of the first optical beam path 715 and the second optical beam path 720 and positioning the second moveable reflector 705b outside the second optical beam path 725. Optical radiation provided at the first input I1 is reflected off the reflector 740 to a reflective surface of the first moveable reflector 705a that faces the reflector 740 which reflects the optical radiation back to the reflector 740 which reflects the optical radiation to the output O2. While the first and second moveable reflectors 705a–b are in the same positions described above, optical radiation can be provided from the second input I2 to the first output O1 and from the third input I3 to the third output O3 along the third optical beam path 725.

The 3×3 blocking MEMS optical switch 700 is referred to as "blocking" because optical radiation is not switched from the second input I2 to the first output O1. FIG. 7C includes a table that describes which inputs are optically coupled to which outputs in the 3×3 blocking MEMS optical switch according to the present invention as a function of the positions of the first and second moveable reflectors 705a,b. According to FIG. 7C, a "zero" indicates that the associated moveable reflector is outside the optical beam path and a "one" indicates that the associated moveable reflector is inside the optical beam path. The operation of the 3×3 blocking MEMS optical switch according to the present invention need not be discussed further herein. Moreover, larger MEMS optical switches according to the present invention having more than three inputs and outputs can also be provided.

FIG. 7B is a plan view of the 3×3 blocking MEMS optical switch illustrated in FIG. 7A according to embodiments of the present invention. As shown in FIG. 7B, the first and second moveable reflectors 705a,b can be moved between the associated first and second positions by actuating members 710a,b in directions 760a,b respectively. In other embodiments according to the present invention, the first and second members 710a,b are rotated parallel to the first face 737a in directions 765a, 765b respectively to move the second moveable reflectors 705a,b to the first and second associated positions. In other embodiments according to the present invention, other directions are used.

Figure 8:
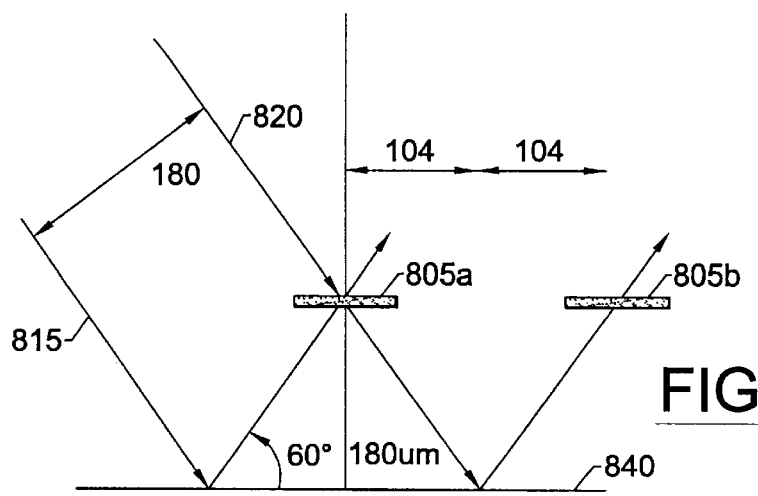
FIG. 8 is a cross-sectional view that illustrates embodiments of moveable reflectors separated from fixed reflectors according to the present invention.

FIG. 8 is a cross-sectional schematic diagram that illustrates embodiments of first and second moveable reflectors 805a, 805b separated from a fixed reflector 840 according to the present invention. As shown in FIG. 8, the first and second movable reflectors 805a,b are separated from the reflector 840 by about 180 μm. A first optical beam path 815 is separated from a parallel second optical beam path 820 by about 180 μm. Optical radiation provided along the first or second optical beam paths 815, 820 define an angle of incidence about 60 degrees with the reflector 840 and the moveable reflectors 805a,b. The first and second moveable reflectors 805a,b are separated from each other by about 208 μm. The first and second moveable reflectors 805a,b have diameters of about 100 μm. In other embodiments according to the present invention, other angles and dimensions are used.

Figure 9:
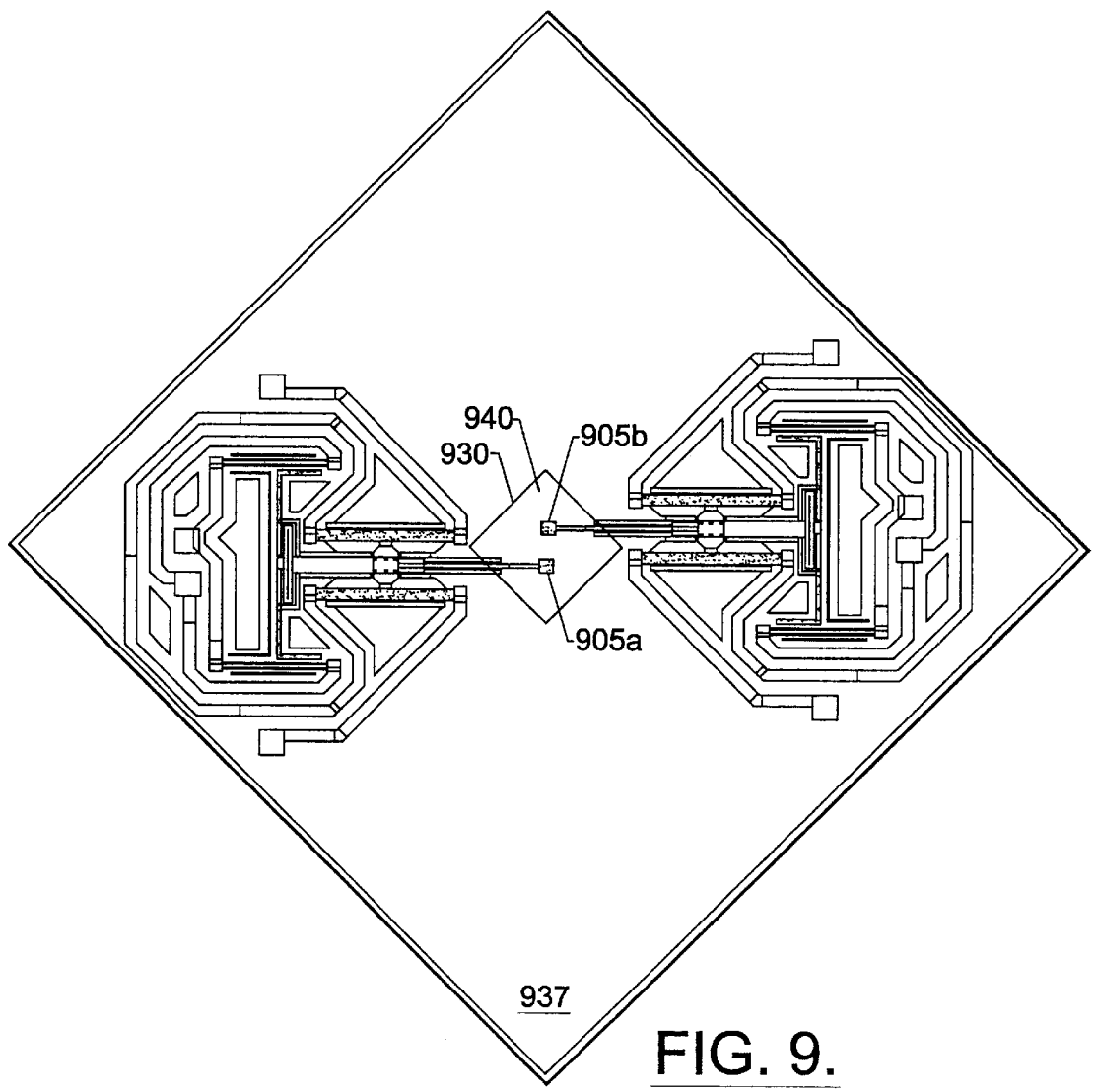
FIG. 9 is a plan view that illustrates embodiments of MEMS optical switch arrays according to the present invention.
Figure 10:
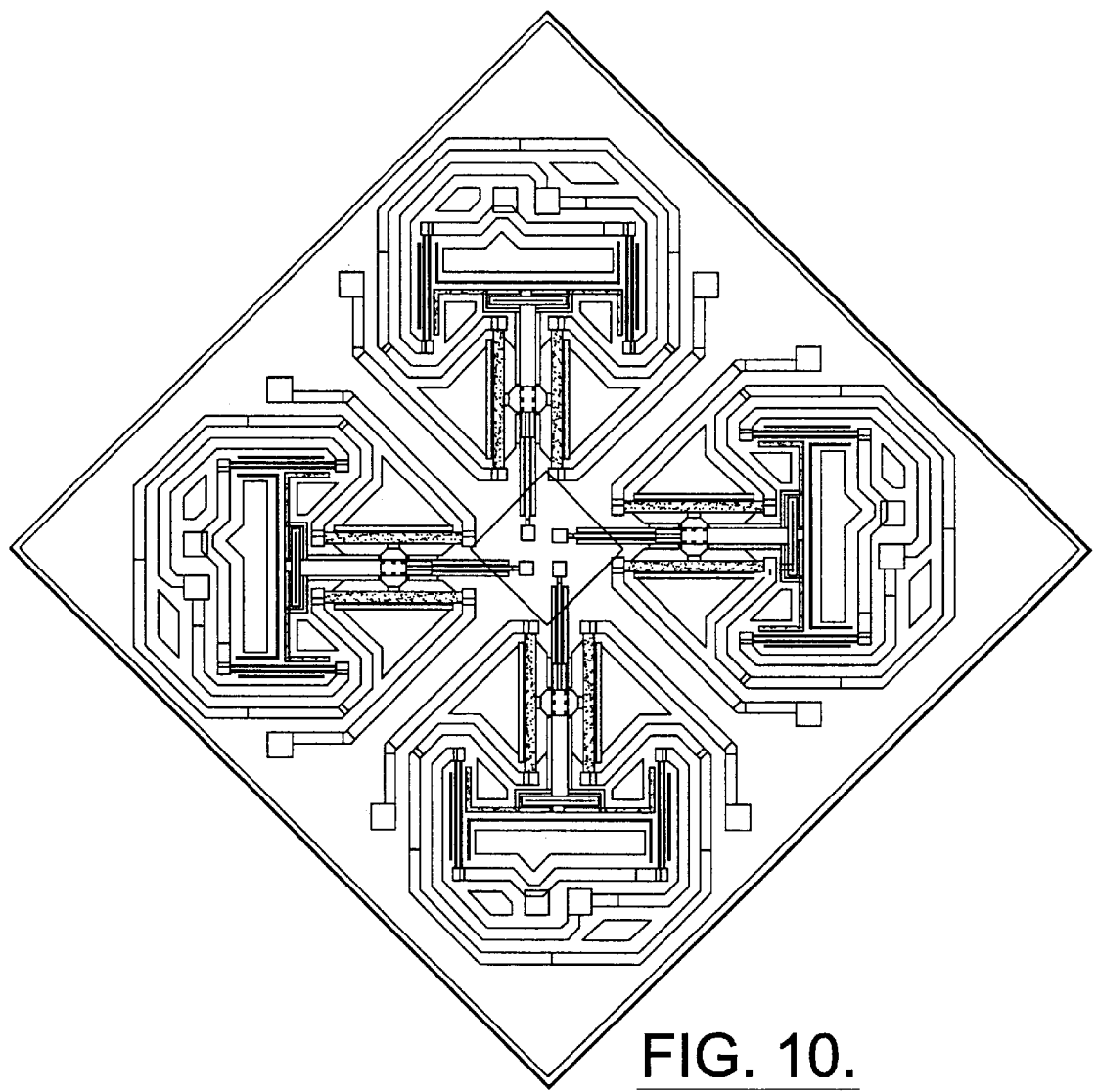
FIG. 10 is a plan view that illustrates embodiments of MEMS optical switch arrays according to the present invention.

FIGS. 9 and 10 are plan views of moveable reflectors and associated thermal arched beam actuators on common substrates according to the present invention. As shown in FIG. 9, first and second movable reflectors 905a,b are positioned over a recess 930 in a substrate 901 having a reflector 940 therein. According to FIG. 10, a 2×2 optical switch array according to embodiments of the present invention includes inputs and outputs that are obliquely angled towards and away from a face of the switch adjacent thereto. The MEMS optical switch also includes four moveable reflectors that move from first associated positions to second associated positions that are parallel to the first positions. The four moveable reflectors can provide separate switching functions a part of an array of switches or may operate together to provide switching operations for a switch having more inputs and outputs.

Figure 11:
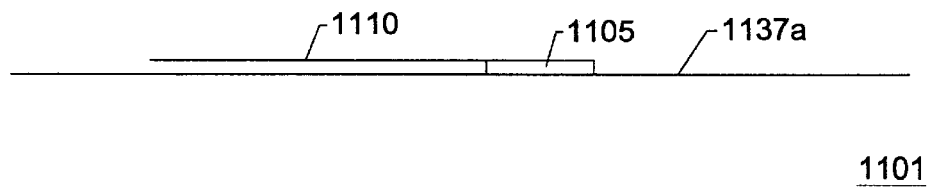
FIGS. 11–15 are cross-sectional views that illustrate method embodiments of forming MEMS optical switches having inputs/outputs obliquely angled towards/away from a face of substrate adjacent thereto and having moveable reflectors with parallel positions according to the present invention.

FIGS. 11–15 are cross-sectional views that illustrate method embodiments for forming MEMS optical switches according to the present invention. As shown in FIG. 11, a moveable reflector 1105 and a member 1110 are formed on a bulk substrate 1101 having a first face 1137a and a second face 1137b opposite the first face 1137a, such as an SOI wafer having a handle wafer attached thereto. In some embodiments according to the present invention, the thickness of a handle substrate on which the oxide and silicon are carried is about 400 $\mu$m. In other embodiments according to the present invention, the thickness of a handle substrate is greater than 400 $\mu$m. The silicon layer can be about 25 $\mu$m thick. In some embodiments according to the present invention, the oxide layer between the silicon and the handle wafer is about 1 $\mu$m to 2 $\mu$m thick.

Figure 12:
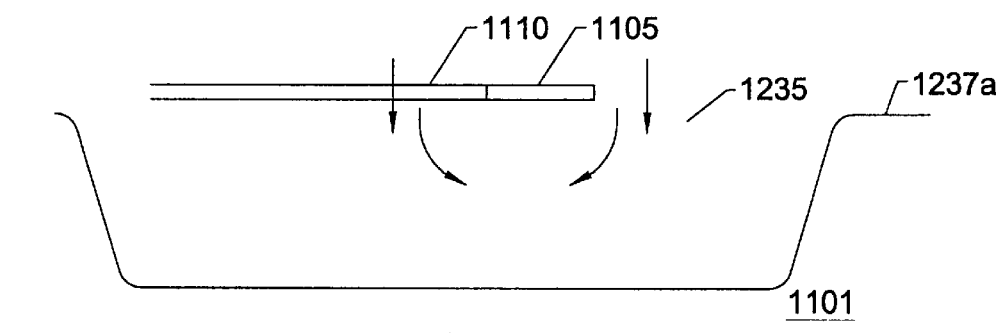

As shown in FIG. 12, a recess 1235 is formed in the first face 1137a, for example, using a wet etch process which frees the member 1110 and the reflector 1105 from the substrate 1101. In some embodiments according to the present invention, an anisotropic or isotropic wet process is used. In other embodiments according to the present invention, a KOH etching process is used. In still other embodiments according to the present invention, an isotropic RIE etch process is used. In some embodiments according to the present invention, the member 1110 is coupled to an actuator as discussed above and which is not shown. The actuator can be formed concurrent with, before, or after the steps shown in FIGS. 11–15.

Figure 13:
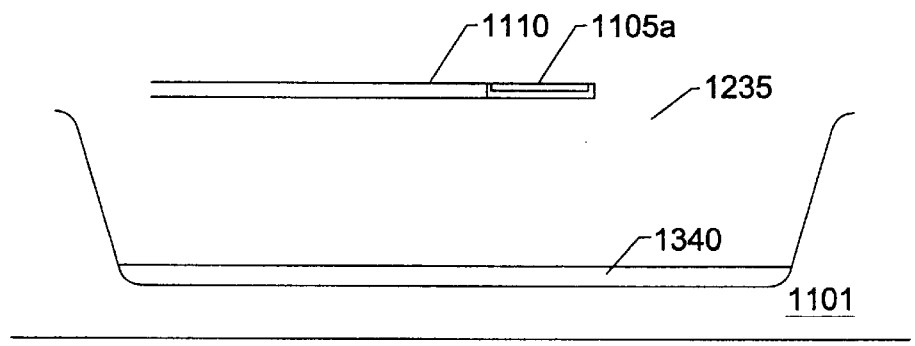

As shown in FIG. 13, a reflective material such as a metal, is deposited in the recess 1235 and on the reflector 1105 to form a reflector 1340 in the recess 1235 and to form a first reflective surface 1105a on the reflector 1105 facing away from the reflector 1340. The first reflective surface 1105a can be formed as described above in reference to FIGS. 2A and 2B. A stop layer can be formed on the reflector 1340.

Figure 14:
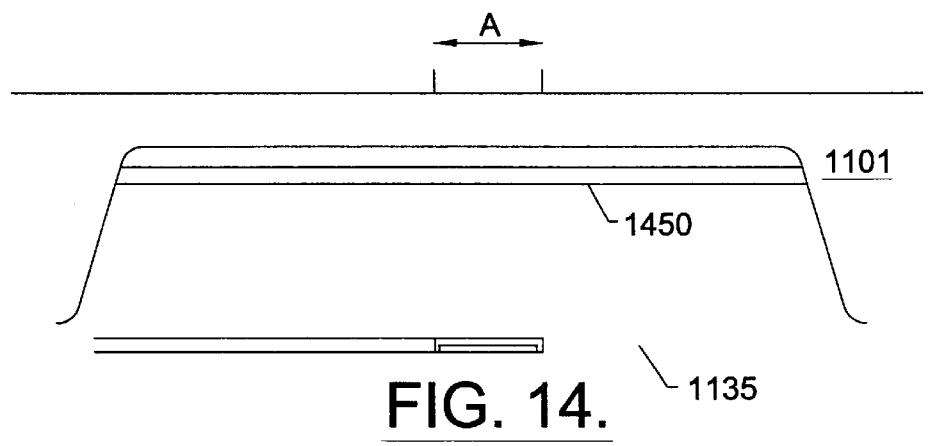
Figure 15:
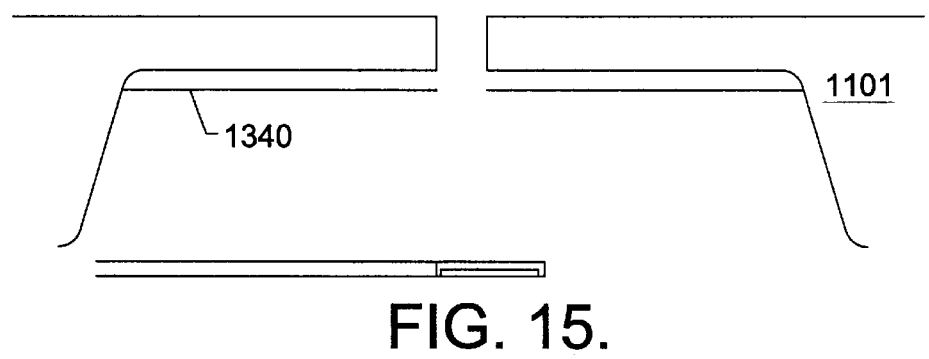

As shown in FIG. 14, a pattern A is formed on the second face 1137b of the substrate 1101 that overlaps the reflector 1105 using, for example, conventional photolithography. A hole is formed in the substrate 1101 to expose using the reflector 1105 using the pattern A. In some embodiments according to the present invention, the hole is formed using a deep RIE process. In other embodiments according to the present invention, other processes are used. The stop layer on the reflector 1340 can reduce the etching beyond the reflector 1340. A metal is deposited on the side of the reflector 1105 that faces toward the reflector 1340 through the hole to form the moveable reflector as shown in FIG. 15.

In some embodiments according to the present invention, the moveable reflectors are initially outside the optical beam path when formed. For example, according to FIG. 1D, when the moveable reflectors are formed they are initially inside the optical beam path. In other embodiments according to the present invention, the moveable reflectors are initially outside the optical beam path when formed. For example, according to FIG. 1E, when the moveable reflectors are formed they are initially outside the optical beam path.

Figure 16A:
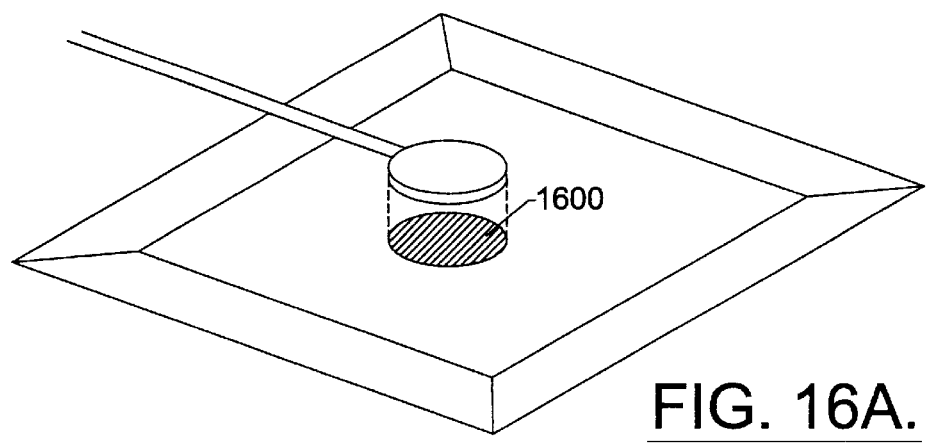
FIGS. 16A and 16B are perspective views that illustrate embodiments of holes formed in the reflector and substrate that overlap the initial positions of reflectors according to the present invention.
Figure 16B:
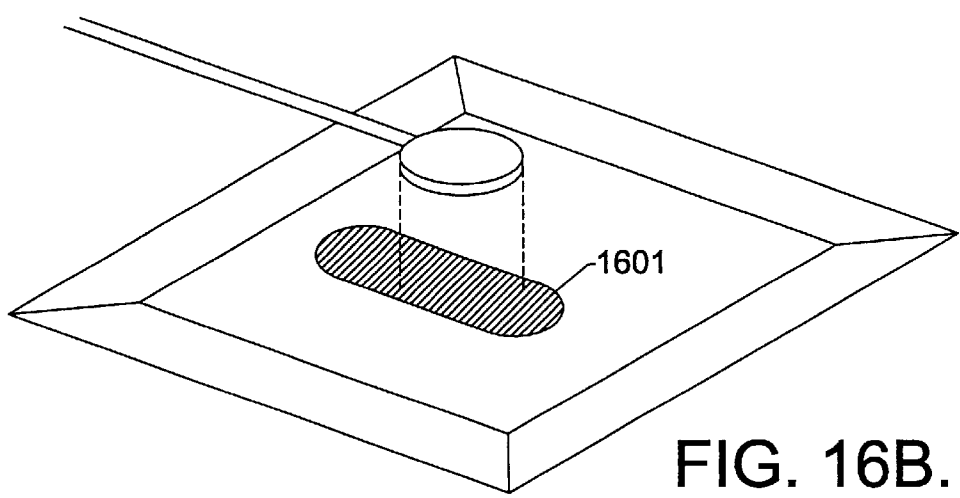

In either type of embodiment according to the present invention, a hole 1600 is formed to expose the moveable reflectors through the substrate, as shown for example, in FIG. 16A. In some embodiments according to the present invention, as shown in FIG. 16B, a hole 1601 is elongated to expose the moveable reflector through the substrate whether the moveable reflector is formed to be initially inside or outside of the optical beam path.

Pursuant to embodiments according to the present invention, the inputs and outputs of a MEMS optical switch are obliquely angled towards and away from a face thereof and adjacent thereto. A moveable reflector is configured to be moved from a first position to a second position, that is parallel to the first position, to switch optical radiation from the inputs to the outputs. Having the inputs and outputs obliquely angled towards and away from the same face and adjacent thereto may reduce the size and/or the complexity of packaging the optical switch. Accordingly, the cost of the optical switch may be reduced.

In the drawings and specification, there have been disclosed typical preferred embodiments of the invention. It will also be understood that the present invention is not limited to order of the steps discussed herein. In fact, in some method embodiments, the steps may be performed in a different order than those discussed herein or steps may be performed concurrently with one another. Although specific terms and sequences are described, they are used in a generic and descriptive sense only and not for purposes of limitation, the scope of the invention being set forth in the following claims.

What is claimed:

1. A MEMS optical switch comprising:
   a substrate having first and second opposing faces and a plurality of moveable reflectors on the first face;
   an input that is obliquely angled towards the first face adjacent thereto and that optically couples optical radiation towards the first face;
   at least one of the plurality of moveable reflectors on the first face being configured to move from a first position to a second position that is parallel to the first position to reflect the optical radiation from the input to provide reflected optical radiation; and
   an output that is obliquely angled away from the first face adjacent thereto and that optically couples the reflected optical radiation away from the first face.

2. A MEMS optical switch according to claim 1 wherein the moveable reflector moves between the first and second positions in a direction that is parallel to the first face.

3. A MEMS optical switch according to claim 1 further comprising:
   a member that extends in a direction on the first face and is coupled to the moveable reflector; and
   an actuator on the first face and coupled to the member, wherein the actuator moves the moveable reflector between the first and second positions in the direction parallel to the first face.

4. A MEMS optical switch according to claim 3 wherein a thickness of a reflective portion of the moveable reflector that reflects the optical radiation is less than a thickness of the member.

5. A MEMS optical switch according to claim 4 wherein the reflective portion comprises metal and the member comprises silicon.

6. A MEMS optical switch according to claim 1 further comprising:
   a member on the first face and coupled to the moveable reflector; and
   an actuator on the first face and coupled to the member, wherein the actuator rotates the member in a direction that is parallel to the first face to move the moveable reflector between the first and second positions.

7. A MEMS optical switch comprising:
   a substrate having first and second opposing faces and at least one side therebetween;
   an input that is obliquely angled towards the first face adjacent thereto and that optically couples optical radiation towards the first face;
   a movable reflector on the first face that is configured to move from a first position to a second position that is parallel to the first position to reflect the optical radiation from the input to provide reflected optical radiation;

an output that is obliquely angled away from the first face adjacent thereto and that optically couples the reflected optical radiation away from the first face; and a reflector on the first face wherein the moveable reflector is cantilevered over the reflector in the second position.

8. A MEMS optical switch according to claim 7 further comprising:

a recess in the first face, wherein the reflector is in the recess.

9. A MEMS optical switch comprising:

a substrate having first and second opposing faces and at least one side therebetween;

an input that is obliquely angled towards the first face adjacent thereto and that optically couples optical radiation towards the first face;

a movable reflector on the first face that is configured to move from a first position to a second position that is parallel to the first position to reflect the optical radiation from the input to provide reflected optical radiation;

an output that is obliquely angled away from the first face adjacent thereto and that optically couples the reflected optical radiation away from the first face, wherein the reflected optical radiation comprises first reflected optical radiation and wherein the output comprises a first output;

a reflector, on the first face beneath the moveable reflector, that reflects the optical radiation from the input when the moveable reflector is in the first position to provide second reflected optical radiation; and a second output, obliquely angled away from the first face adjacent thereto, that optically couples the second reflected optical radiation away from the first face.

10. A MEMS optical switch according to claim 1 further comprising:

a recess in the first face aligned with the moveable reflector in the second position.

11. A 2×2 MEMS optical switch comprising:

a substrate having first and second opposing faces and at least one side therebetween;

first and second inputs, obliquely angled towards the first face adjacent thereto and that couple first and second optical radiation towards the first face;

first and second outputs, obliquely angled away from the first face adjacent thereto, wherein first and second optical beam paths are defined to include the first and second inputs and outputs respectively; and a movable reflector on the first face that is configured to move from a first position to a second position that is parallel to the first position to reflect optical radiation from at least one of the optical beam paths to one of the outputs.

12. A MEMS optical switch according to claim 11 wherein the moveable reflector moves between the first and second positions in a direction that is parallel to the first face.

13. A 2×2 MEMS optical switch comprising:

a substrate having first and second opposing faces and at least one side therebetween;

first and second inputs, obliquely angled towards the first face adjacent thereto and that couple first and second optical radiation towards the first face;

first and second outputs, obliquely angled away from the first face adjacent thereto, wherein first and second optical beam paths are defined to include the first and second inputs and outputs respectively;

a movable reflector on the first face that is configured to move from a first position to a second position that is parallel to the first position to reflect optical radiation from at least one of the optical beam paths to one of the outputs; and a reflector on the first face beneath the moveable reflector, wherein the moveable reflector is cantilevered over the reflector when in the second position.

14. A MEMS optical switch according to claim 13 further comprising:

a recess in the first face, wherein the reflector is in the recess.

15. A MEMS optical switch according to claim 13 wherein a first optical beam path is defined from the first input to the first output and a second optical beam path is defined from the second input to the second output, wherein the moveable reflector comprises a first reflective surface facing away from the reflector and a second reflective surface, opposite the first reflective surface, that faces towards the reflector;

wherein first optical radiation is reflected off the reflector from the first input to the first output along the first optical beam path and second optical radiation is reflected off the reflector from the second input to the second output along the second optical beam path when the moveable reflector is in the first position;

wherein the first optical radiation is reflected off the reflector to the second reflective surface along the first optical beam path and off the reflector to the second output along the second optical beam path when the moveable reflector is in the second position; and wherein the second optical radiation is reflected off the first reflective surface to the first output when the moveable reflector is in the second position.

16. A 3×3 blocking MEMS optical switch comprising:

a substrate having first and second opposing faces and at least one side therebetween;

first, second and third inputs, obliquely angled towards the first face adjacent thereto, that optically couple first, second, and third optical radiation towards the first face;

first, second, and third outputs, obliquely angled away from the first face adjacent thereto, wherein first, second, and third optical beam paths are defined to include the first, second and third inputs and outputs respectively; and first and second movable reflectors on the first face that move from associated first positions to associated second positions that are parallel to the first positions to reflect optical radiation from at least one of the optical beam paths to one of the outputs.

17. A 3×3 blocking MEMS optical switch comprising:

a substrate having first and second opposing faces and at least one side therebetween;

first, second and third inputs, obliquely angled towards the first face adjacent thereto, that optically couple first, second, and third optical radiation towards the first face;

first, second, and third outputs, obliquely angled away from the first face adjacent thereto, wherein first, second, and third optical beam paths are defined to include the first, second and third inputs and outputs respectively;

first and second movable reflectors on the first face that move from associated first positions to associated second positions that are parallel to the first positions to reflect optical radiation from at least one of the optical beam paths to one of the outputs; and a reflector on the first face beneath the first and second moveable reflectors, wherein the reflector reflects optical radiation along the first, second, and third optical beam paths.

18. A 3×3 blocking MEMS optical switch according to claim 17:

wherein optical radiation is reflected from the first input to the second output and optical radiation is reflected from the second input to the first output when the first moveable reflector is in the associated second position at an intersection of the first and second optical beam paths and when the second moveable reflector is in the associated first position.

19. A 3×3 blocking MEMS optical switch according to claim 17:

wherein optical radiation is reflected from the first input to the third output and optical radiation is reflected from the second input to the first output and optical radiation is reflected from the third input to the second output when the first moveable reflector is in the associated second position at an intersection of the first and second optical beam paths and when the second moveable reflector is in the associated second position at an intersection of the second and third optical beam paths.

20. A 3×3 blocking MEMS optical switch according to claim 17 wherein the first and second moveable reflectors are cantilevered over the reflector in the second position.

21. A 3×3 blocking MEMS optical switch according to claim 17 further comprising:

a recess in the first face, wherein the reflector is in the recess; and wherein the first and second moveable reflectors are cantilevered over the recess from opposing sides of the recess.

22. A 3×3 blocking MEMS optical switch according to claim 21 wherein the first and second moveable reflectors are unaligned with one another on the opposing sides of the recess.

23. A 3×3 blocking MEMS optical switch according to claim 16, wherein at least one of the optical beam paths defines one of a 45 degree angle, a 40 degree angle, and a 60 degree angle with the first face.

24. A 3×3 blocking MEMS optical switch according to claim 16, wherein at least one of moveable reflectors is separated from the first face by one of about 200 μm, about 208 μm, and about 238 μm.

25. A method of forming a MEMS optical switch comprising:

forming a member on a first face of a substrate;

etching around the member to form a recess in the first face of the substrate adjacent to the member;

forming a reflector in the recess;

forming a first reflective surface on a first side of the member that faces away from the reflector;

etching through the substrate and the reflector from a second face of the substrate that is opposite the first face to expose a second side of the member opposite the first side; and forming a second reflective surface on the second side of the member that faces towards the reflector.

26. A method according to claim 25 wherein etching through the substrate and the reflector from a second face of the substrate comprises etching through the substrate to form a hole aligned to an initial position of the member.

27. A method according to claim 26 wherein the hole is elongated in a direction in which the member is configured to move.

28. A MEMS optical switch according to claim 1 further comprising:

a recess in the first face of the substrate having a recess bottom beneath the moveable reflector.

29. A MEMS optical switch according to claim 1 wherein the moveable reflector includes first and second reflective surfaces on opposite sides thereof.

30. A 2×2 MEMS optical switch according to claim 11 further comprising:

a plurality of moveable reflectors on the first face of the substrate.

31. A 3×3 blocking MEMS optical switch according to claim 16 further comprising:

a plurality of moveable reflectors on the first face of the substrate.

* * * * *